United States Patent
Schweizer et al.

(10) Patent No.: US 12,450,290 B2
(45) Date of Patent: Oct. 21, 2025

(54) ESTIMATING GRAPH SIZE AND MEMORY CONSUMPTION OF DISTRIBUTED GRAPH FOR EFFICIENT RESOURCE MANAGEMENT

(71) Applicant: Oracle International Corporation, Redwood Shores, CA (US)

(72) Inventors: Jonas Schweizer, Schlieren (CH); Arnaud Delamare, Zurich (CH); Jinsu Lee, San Mateo, CA (US); Sungpack Hong, Palo Alto, CA (US); Hassan Chafi, Palo Alto, CA (US); Vasileios Trigonakis, Zurich (CH)

(73) Assignee: Oracle International Corporation, RedwoodShores, CA (US)

( * ) Notice: Subject to any disclaimer, the term of this patent is extended or adjusted under 35 U.S.C. 154(b) by 0 days.

(21) Appl. No.: 18/384,248

(22) Filed: Oct. 26, 2023

(65) Prior Publication Data

US 2025/0139163 A1 May 1, 2025

(51) Int. Cl.
*G06F 16/901* (2019.01)
*G06F 11/32* (2006.01)

(52) U.S. Cl.
CPC ........ *G06F 16/9024* (2019.01); *G06F 11/328* (2013.01)

(58) Field of Classification Search
USPC ........................................................ 707/798
See application file for complete search history.

(56) References Cited

U.S. PATENT DOCUMENTS

| | | | |
|---|---|---|---|
| 2006/0206882 A1* | 9/2006 | Illowsky | G06F 9/5072 717/148 |
| 2015/0229546 A1* | 8/2015 | Somaiya | H04L 67/10 715/736 |
| 2016/0078361 A1* | 3/2016 | Brueckner | H04L 67/10 706/12 |
| 2017/0255674 A1* | 9/2017 | Attaluri | G06F 16/24542 |
| 2020/0042836 A1* | 2/2020 | Okada | G06F 18/295 |
| 2020/0117762 A1* | 4/2020 | Haprian | G06F 16/9024 |
| 2021/0406717 A1* | 12/2021 | Tauheed | G06N 20/10 |
| 2023/0108964 A1* | 4/2023 | Isen | G06F 12/0811 711/154 |
| 2023/0134683 A1* | 5/2023 | Carranza | G06F 9/5038 711/127 |
| 2023/0280738 A1* | 9/2023 | Villero | G06Q 10/06312 702/34 |

* cited by examiner

*Primary Examiner* — Joshua Bullock
(74) *Attorney, Agent, or Firm* — Hickman Becker Bingham Ledesma LLP; Stephen R. Tkacs

(57) ABSTRACT

An estimator is provided that can be used to get an estimate of final graph size and peak memory usage of the graph during loading, based on sampling of the graph data and using machine learning (ML) techniques. A data sampler samples the data from files or databases and estimates some statistics about the final graph. The sampler also samples some information about property data. Given the sampled statistics gathered and estimated by the data sampler, a graph size estimator estimates how much memory is required by the graph processing engine to load the graph. The final graph size represents how much memory will be used to keep the final graph structures in memory once loading is completed. The peak memory usage represents the memory usage upper bound that is reached by the graph processing engine during loading.

20 Claims, 6 Drawing Sheets

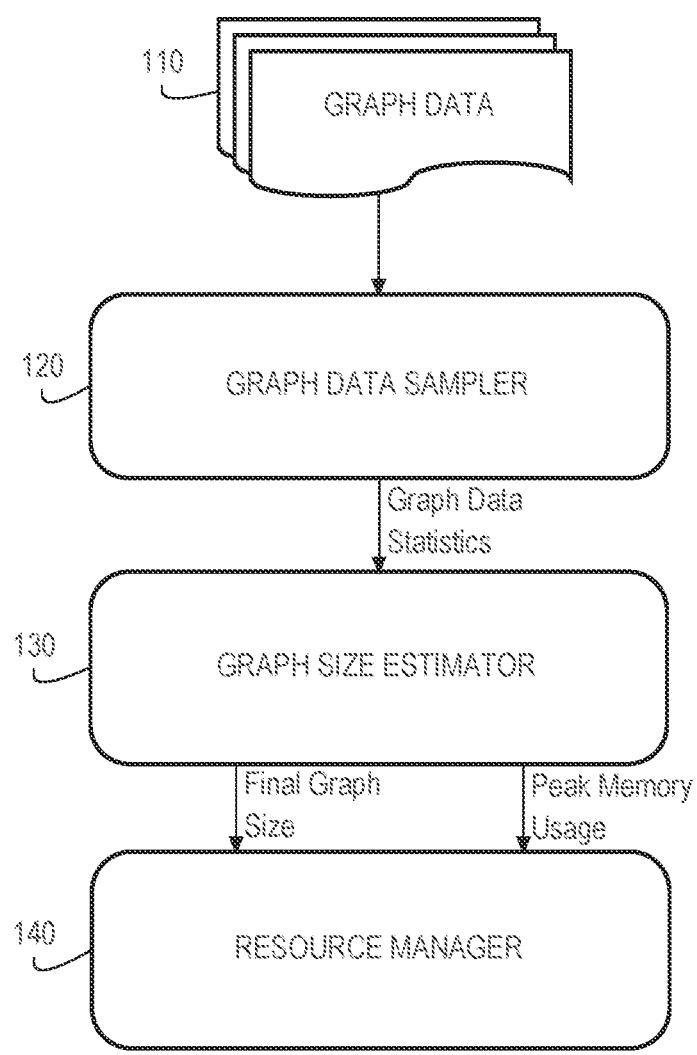

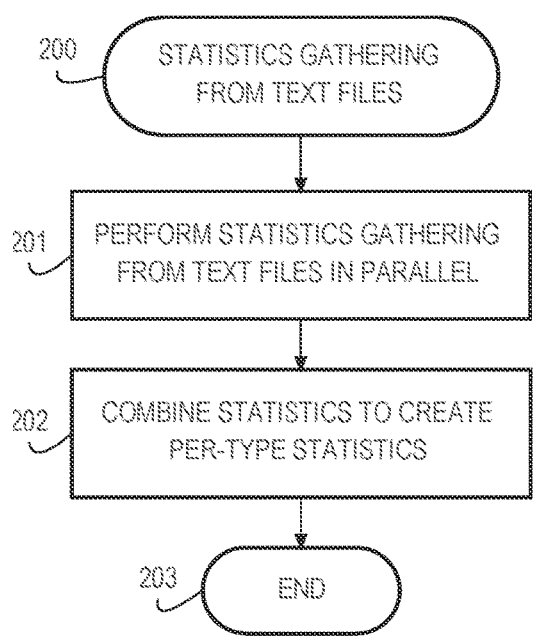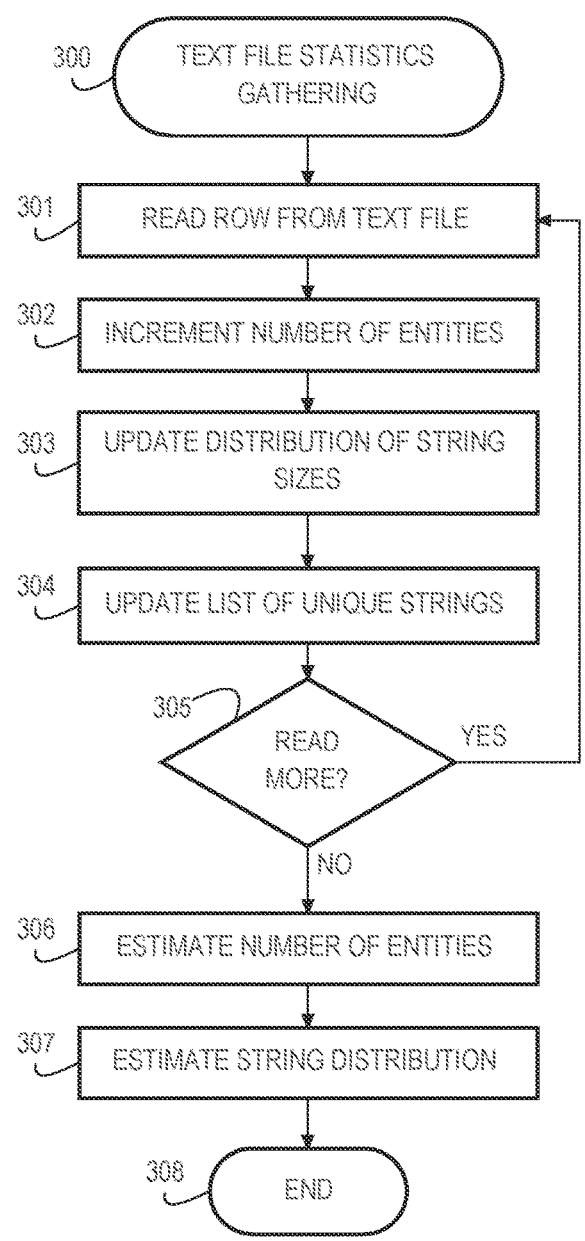

FIG. 4
File 1
1, 23.4
2, 13.6
3, 765.32
...
File 100
...
99999998, 13.6
99999999, 765.32
100000000, -978.1
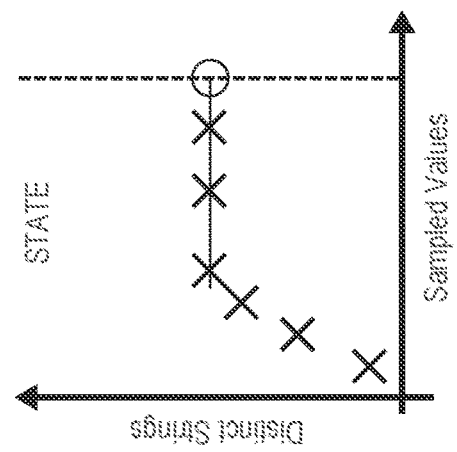
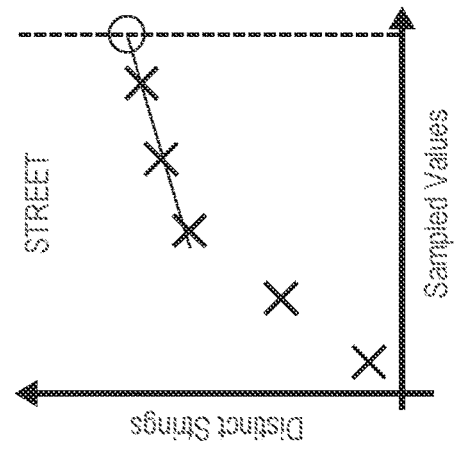
FIG. 5
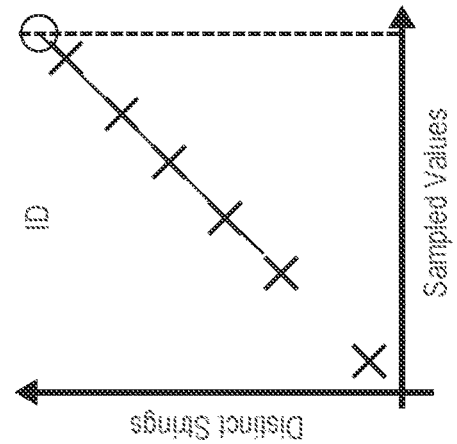

ESTIMATING GRAPH SIZE AND MEMORY
CONSUMPTION OF DISTRIBUTED GRAPH
FOR EFFICIENT RESOURCE
MANAGEMENT

FIELD OF THE INVENTION

The present invention relates to distributed graph processing and, more specifically, to estimating graph size and memory consumption of distributed graphs for efficient resource management.

BACKGROUND

In a distributed graph processing system, predicting the workload is a crucial problem. If the cluster is static, meaning no machines can be dynamically added or removed at runtime, then future workloads must be known at the cluster boot-up time. Incorrectly predicting the workload will result in either not having enough capacity to complete the given task or using a surplus of machines, which leads to extra cost potentially without leading to any benefit.

Given an elastic distributed graph processing system, which can dynamically add or remove machines from a cluster based on the workload, incorrectly predicting the future workloads' needs can lead to severe issues. If the cluster is under-provisioned (i.e., it lacks machines compared to its needs), the workloads will likely not have enough memory available to complete, and some other solutions, like disk spilling or adding new machines, must be employed. The former solution causes severe performance degradations compared to a fully in-memory execution, while the latter requires the cluster to pause the workload, wait for the new machine to join, and then transfer parts of the data to the new machine, which is time consuming and uses a large portion of the network bandwidth. Overall, in such a case, the latency for loading a graph will be much higher. On the other hand, over-provisioning the cluster (i.e., having more machines than strictly required) will increase the cost for customers and given specific workloads, could slow down execution due to more data being accessed remotely.

These problems are especially true for graph loading. For instance, the operation of reading graph data from an external source, e.g., some text files or a database, and transforming the graph data into efficient graph data structures internal to the distributed graph processing engine. Unlike relational databases, this problem is even more crucial for two main reasons. First, the bulk of the graph data processing is done in memory for performance reasons. Hence, as mentioned above, under-provisioning will lead to severe performance degradation, whereas with a relational database, as disks are the main source of storage, only a small penalty will be applied. Secondly, because of the internal graph data structures, such as compressed sparse row (CSR) data structures, a lot more processing must be performed on the ingested data, which increases the peak memory usage compared to the final graph size. Furthermore, writing a tool capable of estimating the memory usage of graph loading is complex and difficult to maintain if the engine's code is updated and improved, especially due to the distributed nature of the engine and the complexity of the pre-processing of graph data. Finally, predicting the in-memory size of the graph data based on the input files is not trivial. Unlike in relational database management systems (RDBMSs), where table-style data are stored as table-style data structures, for graph processing engines, the original data is also stored as table-style data structures but is enriched by the loading process, e.g., with explicit edges that are not known a-priori and their size can vastly out-scale the vertex data structures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 is a block diagram illustrating a graph size estimator in a distributed graph processing engine in accordance with an illustrative embodiment.

FIG. 2 is a flowchart illustrating operation of a graph data sampler performing statistics gathering from text files in parallel in accordance with an illustrative embodiment.

FIG. 3 is a flowchart illustrating operation of a graph data sampler performing text file statistics gathering in accordance with an illustrative embodiment.

FIG. 4 illustrates graph data files containing vertex keys and one floating point property split into multiple files in accordance with an illustrative embodiment.

FIG. 5 illustrates properties having three classes of number of distinct strings in accordance with an illustrative embodiment.

DETAILED DESCRIPTION

Figure 6:
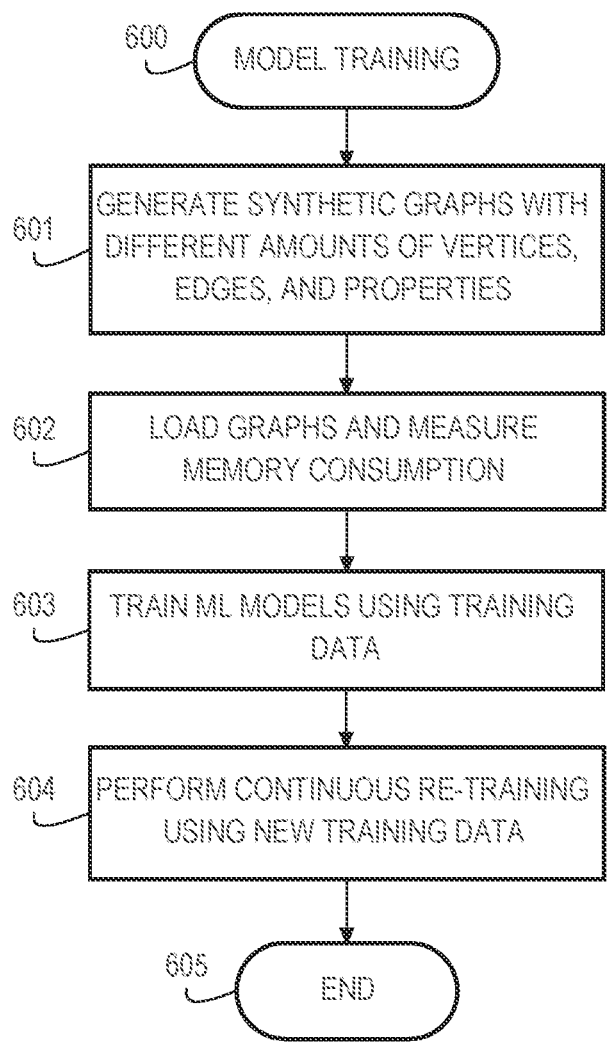
FIG. 6 is a flowchart illustrating operation of model training in a graph size estimator in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide an estimator that can be used to get an estimate of the final graph size, as well as the peak memory usage of the graph during loading, based on sampling of the graph data and using machine learning (ML) techniques. The end memory size of the graph is generally lower than the size of the intermediate state that is used to generate the final graph; therefore, a good estimator should provide an estimation with good accuracy for such an estimation as well. Given the input graph data and a specific distributed graph processing engine, the estimator of the illustrative embodiments predicts key statistics about the graph data, as well as how much memory will be required to load such a graph in the system. Before even attempting to load the graph, the estimator scans the data and generates predictions regarding whether the current state of the cluster will allow loading the given graph. If more machines are required, they can all join the cluster at the same time before the loading starts, which improves latency as this operation is faster than each machine joining one by one during graph loading. With those benefits, the estimator of the illustrative embodiments allows under-provisioned clusters to quickly react and grow to the required size, hence not wasting resources during the actual loading. At the same time, the estimator allows over-provisioned clusters to know that some of the machines are not required, hence saving money by shutting down machines.

The estimator of the illustrative embodiments is composed of two main components. The first component is a data sampler. Before a graph starts loading, the data sampler samples the data from files or databases and estimates some statistics about the final graph. For example, for each type of vertex and edge, the sampler attempts to estimate how many vertices and edges there will be in the final graph. The sampler also samples some information about property data, such as string length and number of distinct values. The second component is a graph size estimator. Given the sampled statistics gathered and estimated by the data sampler, the graph size estimator estimates how much memory is required by the graph processing engine to load the graph. The graph size estimator predicts two main values: final graph size and peak memory usage. The final graph size represents how much memory will be used to keep the final graph structures in memory once loading is completed. The peak memory usage represents the memory usage upper bound that is reached by the graph processing engine during loading (across all machines).

The estimator of the illustrative embodiments significantly reduces the amount of unnecessary work that could be performed by a graph loading operation in cases where the graph processing system lacks the memory required to complete graph loading properly. If new machines are required for loading to complete, the estimator very quickly indicates to the engine how many new machines are required. If the required machines are not available, then the operation can be quickly aborted without wasting time and resources. In both cases, the estimator avoids unnecessary work that would be wasted due to insufficient memory, saving time and cost for the user.

Furthermore, the graph size estimator uses machine learning techniques and treats the distributed graph engine as a black box. The ML-based estimator does not need to know the internals of the distributed graph processing engine to work properly. The estimator is initially trained based on a few graphs and can be continuously retrained. In response to updating the code of the distributed graph processing engine, the estimator can be updated by retraining the ML models rather than rewriting the estimator code. In order for the data sampler to generate estimated statistics over the graph data, some time is required before loading starts. However, this can be very brief and configurable (e.g., the data sampler can be configured to read a small percentage of the overall graph over a small period of time), hence having a negligible impact in the worst cases.

Estimating Graph Size

Distributed graph processing enables the analysis of very large-scale graphs and can leverage the elasticity of the cluster to scale and better fit the current workload. One aspect that is key for good scaling is the ability to accurately predict the size that graphs will occupy in the system before they are loaded in order to prevent both over and under provisioning, which both have specific problems. The illustrative embodiments provide an estimator that can be used to get an estimate of the final graph size and the peak memory usage of the graph during loading based on sampling of the graph data and using machine learning techniques.

FIG. 1 is a block diagram illustrating a graph size estimator in a distributed graph processing engine in accordance with an illustrative embodiment. Graph data sampler 120 samples graph data 110 that is to be loaded by the distributed graph processing engine and produces estimated graph data statistics. For purposes of illustration, this description assumes a property graph model with different types of vertices and edges. Each type of vertex and edge has its own set of properties with their own characteristics. The sampler produces a set of statistics per vertex and edge type, independently of the others. Depending on the data source, the sampler can either get an exact result for the statistics or estimate the statistics for performance reasons.

Graph Data Sampler

Sampled Statistics

The main statistic that is sampled is the number of entities per type. This is crucial to determine graph size. Based on the number of entities, the size of each fixed-size property can be computed trivially. However, for strings, the lengths impact how much memory is needed to store these properties. This is why the sampled statistics contain, for each string property, the distribution of the string lengths, e.g., as a histogram. Additionally, a typical distributed graph processing engine has the ability to store strings using a dictionary encoding. There is usually a maximum number of entries in the dictionary, and if the number of distinct strings is lower than this amount, all strings of this property are encoded; otherwise, they are stored normally. The sampled statistics should also include, for each property, a Boolean value that indicates whether the property is likely to be encoded. The number of maximum distinct strings is engine-specific and is configurable in the illustrative embodiments. Dictionary encoded strings are particularly important for a distributed graph processing engine because they allow very fast communication between machines, and they allow the machines to send string data simply by sending the dictionary index instead of the full string data.

Data Statistics Gathering from Text Files

The gathering of the statistics depends on how the data is stored. One source of graph data may be simple text files, which can store information in different formats, such as the Comma Separated Values (CSV) format. In a database, data is usually stored in a row-based format, with a custom separator separating each value for each column and a new line separating each row data. Vertices and edges are stored in a similar fashion, the only difference being that vertices and their properties are stored with a distinct key per vertex, while edges are stored with the keys of their source and destination vertices.

When graph data is composed of text files, each vertex or edge type's data is typically stored in many different files that follow the same format. Graph data sampler 120 leverages this fact for both faster execution and more accurate predictions.

The graph data sampler 120 may be executed on a single machine of a cluster for simplicity of implementation; however, it can be modified to enable parallel execution among multiple machines, which can further speed up the execution. The text file data sampler runs sequentially for each type of vertex or edge, in order to produce per-type statistics. For reach type, the text file data sampler can run in parallel on multiple threads, reading many files at the same time. Not all files must be read, because reading a decent subset of the files will yield results very close to what could be achieved reading all files.

FIG. 2 is a flowchart illustrating operation of a graph data sampler performing statistics gathering from text files in parallel in accordance with an illustrative embodiment. Operation begins (block 200), and the graph data sampler performs statistics gathering from text files in parallel using multiple threads (block 201). When parallel execution completes, the graph data sampler combines the statistics from the threads to create per-type statistics (block 202). Thereafter, operation ends (block 203).

In one embodiment, each thread starts reading the file assigned to it and executes according to the following pseudocode:

```
numEntities = 0;
stringsDistribution;
distinctStrings;
while(shouldReadMore( )) {
   row = readRow( );
   numEntities++;
   for (stringProp: getStringProps( )) {
      stringsDistribution.updateDistribution(row.get(stringProp));
      distinctStrings.insert(row.get(stringProp));
   }
}
fractionRead = getReadFileBytes( ) / getTotalFileBytes( );
estimatedEntities = numEntities / fractionRead;
estimatedStringDistribution = stringsDistribution / fractionRead;
return {estimatedEntities, estimatedStringDistribution, distinctStrings};
```

When exiting, the threads combine their statistics together to create per-type statistics. An important parameter that must be fine-tuned is how long the per-thread code should run and how many files should be sampled (and which files).

FIG. 3 is a flowchart illustrating operation of a graph data sampler performing text file statistics gathering in accordance with an illustrative embodiment. Operation begins (block 300), and the graph data sampler reads a row from the text file (block 301). The graph data sampler then increments the number of entities (block 302) and updates the distribution of string lengths based on strings for each property encountered in the row (block 303). The distribution is a histogram, for example, of the string lengths for all strings encountered. The graph data sampler also updates the list of distinct strings encountered so far (block 304).

Then, the graph data sampler determines whether to read more rows (block 305). In one embodiment, the number of rows to read is set to about 1,000,000 per type. This provides a trade-off between reading and processing time and accuracy of results. In a typical graph processing engine, the maximum number of strings allowed in the dictionary is much lower than this value. Hence, if after reading approximately one million rows, the number of distinct strings is still lower than the maximum number of strings allowed in the dictionary, then it is very likely that the actual number of distinct strings is lower than this value and it is likely the property can be encoded using a dictionary. In alternative embodiments, the graph data sampler may also be configured to read a percentage of the data or may read rows until a predetermined amount of time has passed. In some embodiments, the determination of whether to read more rows may be configured for each file being read in parallel or may be configured for total rows read for each vertex or edge type. Thus, the graph data sampler may read rows until a predetermined number of rows has been read, a predetermined number of files has been read, a predetermined percentage of rows have been read, or a predetermined amount of time has expired.

If the graph data sampler determines that more rows are to be read (block 305: YES), then operation returns to block 301 to read another row from the same text file or a different text file. If the graph data sampler determines that more rows are not to be read (block 305: NO), e.g., 1,000,000 rows have been read for the vertex or edge type, then the graph data sampler estimates the number of entities (block 306) and estimates the string distribution for each property (block 307). Thereafter, operation ends (block 308). The results comprise a set of per-type statistics.

Regarding how the number of read rows should be spread among the files that are sampled, it is important to note that most graph data files suffer from a kind of bias that makes the first rows typically have a smaller footprint (mostly on disk in the files, although they also tend to have smaller footprints in the graph after loading due to the strings) than the last rows because of typically increasing vertex keys. FIG. 4 illustrates graph data files containing vertex keys and one floating point property split into multiple files in accordance with an illustrative embodiment. In the example depicted in FIG. 4, the graph data files are split into one hundred files for one billion vertices. If only file 1 is read and used to estimate the number of rows of the remaining files, because the vertex keys are much shorter in file 1 compared to file 100, a biased estimator might predict that there are much more rows in the last file compared to the number of actual rows based on the file size and the estimated length of each row due to the shorter strings for the vertex keys. This affects the estimated number of entities (e.g., vertices), as well as the distribution of string lengths.

A solution to this problem is to sample files randomly or, for a deterministic result, using a pattern that ensures that a diverse set of files is read. For example, the graph data sampler may be configured to sample ten files out of one hundred, and files 1, 11, 21, . . . , 100 could be chosen.

One important limitation of a text file graph data sampler is that it is not able to start the sampling anywhere. For instance, in the CSV format, the newline character is used to split rows; however, this character, when part of a string, should not be interpreted as a delimiter but as a normal character in the string. Therefore, the sampler cannot start sampling at a random location (row) within a CSV file; the sampler must start at the beginning of the file. When the number of files is high enough, this does not matter much because the sampler has many choices of which files to sample and need not start in the middle of a file to get accurate results. In some embodiments, sampling about ten files yields a good trade-off between the number of files that are read in parallel and the accuracy of the results.

Determining the Number of Distinct Strings

The graph data sampler 120 uses machine learning techniques to estimate the number of distinct string values more accurately. This allows the graph data sampler 120 to both give a more accurate estimation and reduce the number of strings that must be sampled. To estimate this number, the graph data sampler follows the evolution of the number of distinct string values during the sampling (after each thread completes sampling a file) and classifies the progression of the number of distinct string values within one of three classes. In one embodiment, the graph data sampler uses a classifier ML model to classify each property in one of the three classes. FIG. 5 illustrates properties having three classes of number of distinct strings in accordance with an illustrative embodiment. The three cases for distinct strings of a property are as follows: linearly increasing, increasing rapidly at first and then increasing more slowly, and increasing and then plateauing.

An example of a property with a linearly increasing number of distinct strings is an ID number, such as a social security number or email address. Because the property itself is a unique identifier, the number of distinct strings increases with the number of rows read. If this occurs in all the sampled files, then it can be safely assumed that the string property will not be encoded.

An example of a property that has a number of distinct strings that increases rapidly at first and then increases more slowly is street name or family name. First, a lot of different values are encountered, and later new distinct values are seen rarely. Because the number of street names, for example, is large but finite, more and more rows will have a street name that has already been encountered. Given the estimated total number of entities, the total number of distinct string values can be regressed.

An example of a property that has a number of distinct strings that increases and then plateaus is state. Because the number of states is small and finite, all 50 states will be encountered quickly, and then the number of distinct strings will remain at 50. Once all the distinct strings have been sampled and the number of distinct strings plateaus, the plateau represents the maximum value of the number of distinct strings.

The graph data sampler 120 considers a predetermined subset of the numbers of distinct strings determined during sampling, including the later values for the number of distinct strings. This attempts to include the later values when the number increases more slowly or plateaus in the latter two classes above. For example, the graph data sampler 120 can consider the second half of the recorded numbers of distinct strings. The graph data sampler 120 then fits a line to the values for the number of distinct strings and projects the line to the estimated number of entities to determine an estimated number of distinct strings.

Data Statistics Gathering from Database

Another important source of data for graphs is a database. In accordance with one embodiment, when the graph data is loaded from a database, the graph data sampler 120 submits SQL queries that directly generate the exact or estimated statistics required. One query that may be issued returns the number of entities in a table named <table> that will be loaded. The query is as follows:

SELECT COUNT(*) FROM <table>

Another query may be issued for each string property stored in a column named <col> to estimate the number of distinct strings. This query is as follows:

SELECT APPROX_COUNT_DISTINCT(<col>) FROM <table>

With this query for a database as the graph data source, there is no need to use machine learning to determine the number of distinct strings, because the query above is more precise. If the returned number is higher than the maximum number of strings allowed in the dictionary, some other queries may be issued to gather the distribution of the strings, as follows:

SELECT LENGTHB(<col>), COUNT(*) FROM <table> GROUP BY LENGTHB(<col>) ORDER BY LENGTHB(<col>)

This query returns a histogram that stores the number of strings of each length.

Graph Size Estimator

Returning to FIG. 1, the graph size estimator 130 estimates both the final and peak memory usage of a graph based on the graph data statistics produced by the graph data sampler 120. The accuracy of the graph size estimator 130 is important for the cluster to efficiently use its resources during and after loading. If graph size estimator 130 provides estimates that are significantly wrong, this could lead to serious consequences. If the graph size estimator 130 underestimates the peak and final graph size, then the resource manager 140 may allocate too few machines in the cluster for loading the graph. Then, during loading of the graph, the resource manager 140 of the distributed graph engine may determine that it cannot load the graph using the current number of machines. In this case, loading may be paused, the resource manager 140 must wait for one or more new machines to join the cluster, and the data that has been loaded may be transferred to the new machine if this is supported by the resource manager 140. If not, then loading may be restarted.

On the other hand, if the graph size estimator 130 overestimates the number of machines that are required to load the graph, then this may lead to a higher hardware cost for the customer. Additionally, the resource manager 140 may detect that too many machines are deployed after the graph loading is completed, and the distributed graph processing engine may begin to rebalance the data and remove excess machines from the cluster. These operations are resource-intensive and could be avoided with an accurate estimation.

Estimator Implementation

Estimating the peak memory usage and the final graph size in a distributed graph processing engine is a very complex task. The per-engine implementation of the graph loading process is highly complex and involves a lot of network communication and parallelism. Manually writing an estimator for such an engine is very time consuming and error-prone because it relies on knowledge of the entire loading implementation to write. Additionally, if the loading logic evolves over time, then the estimator might become outdated and would need to be rewritten or at least updated. The illustrative embodiments use an automated technique to estimate the peak memory usage and the final graph size when loading the graph. The graph size estimator 130 can be used on any graph engine without requiring prior knowledge of how the internal logic of the engine works. The graph size estimator 130 automatically tunes itself to make the best estimation possible.

When the graph size estimator 130 is used for the first time in the distributed graph processing engine, the ML models tune themselves. Using linear regression models in some embodiments, the graph size estimator 130 uses synthetically generated data to fit the ML models. The graph size estimator 130 includes one linear model to estimate the loaded size of the graph and a second linear model to estimate the peak size of the graph. The inputs of these models are the outputs of the graph data sampler 120, including, for example, the following:

a. total/estimated number of vertices,
b. total/estimated number of edges,
c. for each of the following property types, the number of occurrences (number of properties of this type for a provider (type) times the number of entities for provider, summed across all providers):
   (i) encoded string (the estimator ignores the sizes of encoding tables),
   (ii) long,
   (iii) float, (iv) double,
(v) local_date,
(vi) integer, and
(vii) non-encoded string, and
d. number of characters of all non-encoded strings across all providers.

The graph size estimator 130 uses both the number of non-encoded strings in the graph and the number of characters of the non-encoded strings. This is to provide a more precise approximation for the strings, which in some languages (e.g., Java) can have a large memory footprint even when the content is empty.

In order to reduce the number of data points needed for regression, the properties can be considered to be similar for all entity providers. If a user knows that it is explicitly not the case, then each property of each provider can be a separate input; however, this will lead to a longer initial tuning.

FIG. 6 is a flowchart illustrating operation of model training in a graph size estimator in accordance with an illustrative embodiment. Operation begins (block 600), and in order to get data points (input and output pairs), several synthetic graphs with different numbers of vertices, edges, and properties are generated as a training data set to be able to train the models to provide the most accurate estimations (block 601). The generation of synthetic graphs includes generating a set of graphs with single properties of different sizes, a set of graphs without properties and different numbers of vertices and edges, and a set of graphs with various numbers of vertices, properties, and edges. In some implementations, each set of graphs may include a small number of graphs, such as three. The set of graphs with single properties of different sizes helps the model understand the size of each property. The set of graphs without properties and different numbers of vertices and edges helps the model understand the size of vertex/edge indexes and their impacts on the graph size. The set of graphs with various numbers of vertices, properties, and edges helps the model check combinations of the findings from the first two sets.

The graph size estimator 130 loads all the graphs and measures their memory consumption (block 602). The graph size estimator 130 then trains the ML models using the training data (block 603) by fitting the linear regression models and using cross-validation to ensure that the models are as robust as possible. The graph size estimator 130 may then be used to estimate the size of any graph and will not require any further tuning stage. This step can be run only once per version of the engine, and then the model can be saved as a file only to be regenerated if the engine's code changes. The file can be shipped alongside the engine in order to avoid requiring each customer to fine-tune the estimator.

If the user knows the internal sizes of the properties in the distributed graph processing engine, the user can specify them, and the graph size estimator 130 will be both faster to tune (no need to sample single property graphs) and more precise. Otherwise, after tuning, the graph size estimator 130 will report the weights of its linear regression models, which can be interpreted as the sizes of each input. The user can then check if the weights make sense according to the system being used. For example, a weight of four for the integer property indicates that the loaded size of an integer in the distributed graph processing engine is four bytes, if the memory consumption is reported in bytes).

The graph size estimator 130 can also operate in a continuous learning mode and perform continuous re-training using new training data (block 604). Each time a graph is loaded into the graph engine, the graph size estimator 130 records anonymized statistics about the graph and its actual peak and final loaded size, which are then added as historical graph loading data to the training data set. Thus, the more graphs that are loaded, the more precise the estimations by the graph size estimator 130 will be. Thereafter, operation ends (block 605). This might be particularly useful because at first the user might load small graphs to play with them and then load larger versions of them, and the user will benefit from more precise estimations. Also, if the user loads the same graph twice, the second time the estimator will have a perfect estimation, because its training data will contain very similar statistics as the loaded graph. The refitting to new training data is very fast (e.g., less than half a second in most cases); therefore, it can be done periodically or even at each loading.

In the illustrative embodiments, the graph size estimator 130 provides the estimated final graph size and the estimated peak memory usage to resource manager 140 to allow the resource manager to configure the cluster of machines with the appropriate number of machines, with the appropriate amount of memory, for loading the graph. In some embodiments, the graph size estimator 130 generates an output based on the estimated final graph size and the estimated peak memory usage and provides the output to a user. For example, the output may be provided to a user prior to loading the graph to notify the user whether sufficient resources are available to load the graph. For instance, if sufficient resources are not available, then the user can modify the graph to be loaded, such as by modifying a query to reference fewer properties or vertex or edge types. As another example, the output, which can be displayed to a user, can include an estimated cost for loading the graph based on a cost for each machine or an amount of memory, which may be specified in a service level agreement (SLA) or the like.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
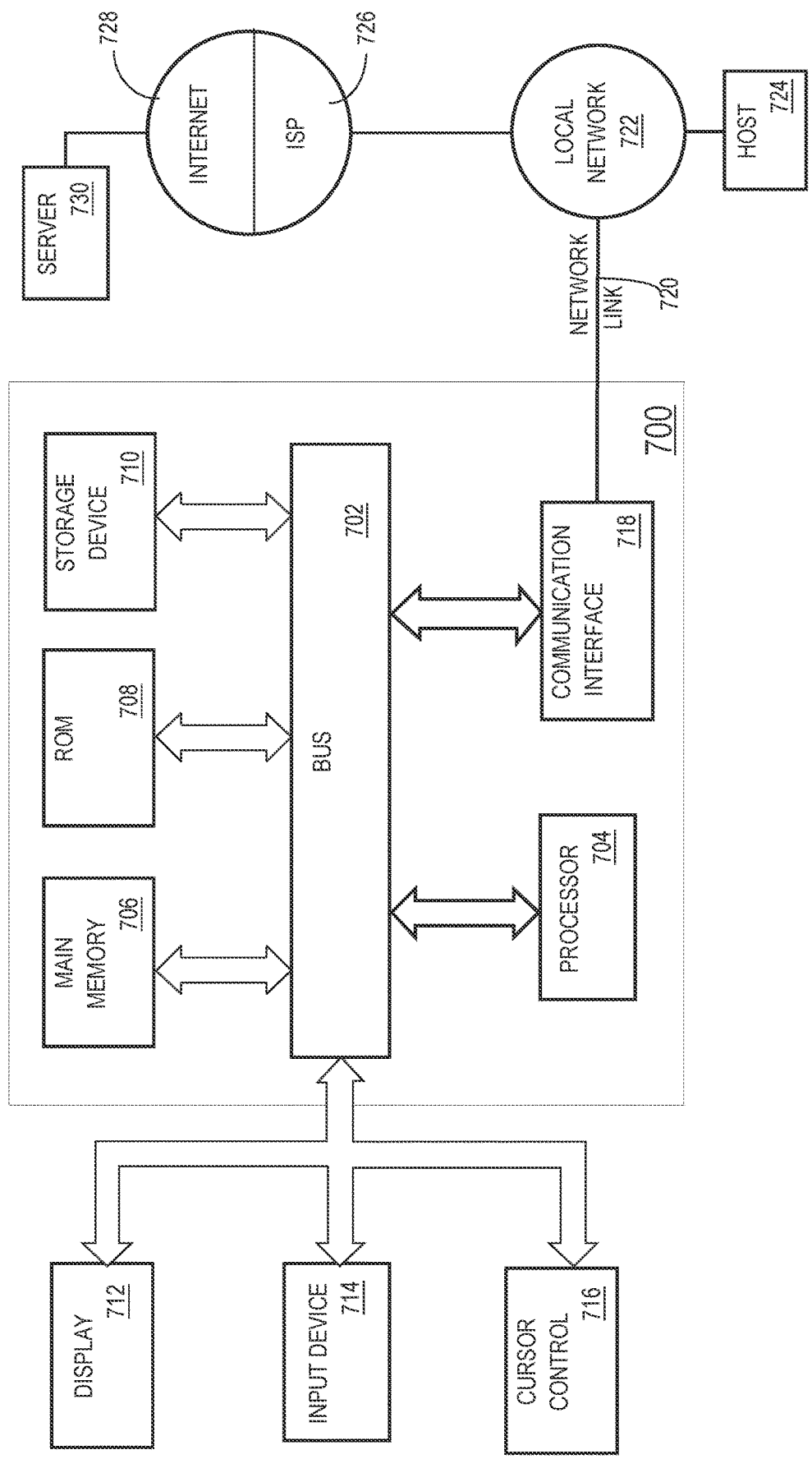
FIG. 7 is a block diagram that illustrates a computer system upon which aspects of the illustrative embodiments may be implemented.

For example, FIG. 7 is a block diagram that illustrates a computer system 700 upon which aspects of the illustrative embodiments may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
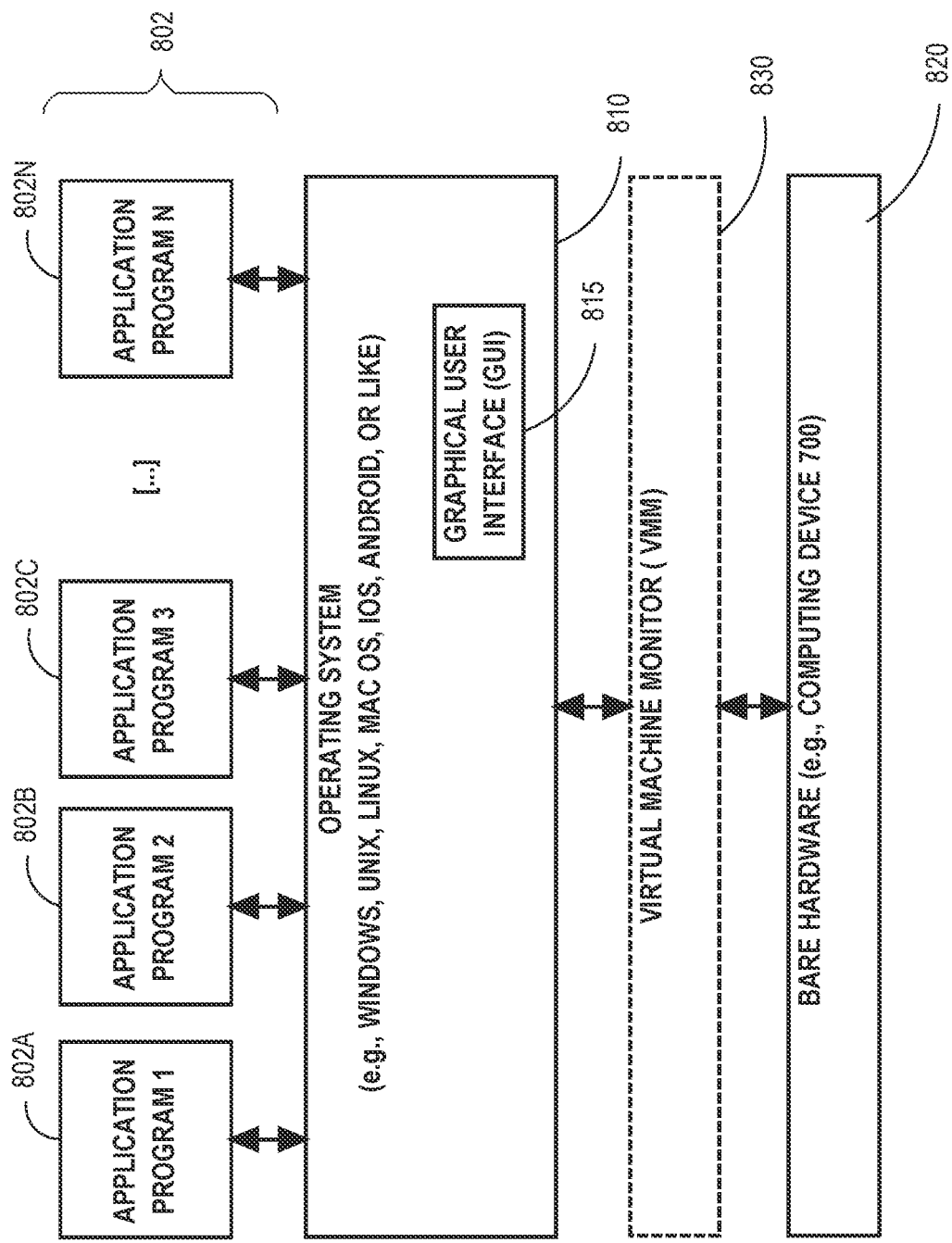
FIG. 8 is a block diagram of a basic software system that may be employed for controlling the operation of a computer system to implement aspects of the illustrative embodiments.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
for a graph to be loaded into memory of one or more machines of a distributed graph processing system, generating a memory consumption estimate by:
sampling graph data of the graph from a source;
estimating graph statistics for the graph based on the sampled graph data;
predicting, based on the graph statistics, an estimated final graph size indicating an amount of memory used to keep a plurality of graph structures in memory,
wherein:
the graph comprises a plurality of entities and one or more edges between entities,
the plurality of graph structures represent the graph, and
the plurality of graph structures comprise at least one vertex data structure representing the plurality of entities of the graph and at least one edge data structure representing the one or more edges between entities; and
predicting, based on the graph statistics, an estimated peak memory usage indicating an upper bound of memory usage across the one or more machines during loading of the graph,
wherein the memory consumption estimate comprises the estimated final graph size and the estimated peak memory usage;
wherein the method is performed by one or more computing devices.

2. The method of claim 1, further comprising determining whether a current state of a cluster of machines is sufficient to load the graph.

3. The method of claim 2, further comprising: in response to determining the cluster of machines is under-provisioned for loading the graph, adding one or more additional machines to the cluster of machines prior to initiating loading of the graph into memory of the cluster of machines.

4. The method of claim 2, further comprising: in response to determining the cluster of machines is over-provisioned for loading the graph, removing one or more machines from the cluster of machines prior to initiating loading of the graph into memory of the cluster of machines.

5. The method of claim 2, further comprising: in response to determining a number of machines required to load the graph is not available, aborting loading of the graph.

6. The method of claim 1, wherein the graph statistics comprise, for each entity type of the plurality of entities, at least one of:
   a number of entities of the entity type,
   a size of each fixed-size property,
   a distribution of string lengths for each string property,
   a number of distinct strings for each string property, or
   for each string property, a Boolean indicating whether the string property is encoded.

7. The method of claim 1, wherein:
   the source is a plurality of text files, and
   sampling graph data comprises sampling a subset of the plurality of text files.

8. The method of claim 7, wherein sampling the subset of the plurality of text files comprises:
   for a given entity type of the plurality of entities, sampling the subset of the plurality of text files using a plurality of threads in parallel; and
   combining statistics from the plurality of threads to generate per-type statistics for the given entity type.

9. The method of claim 7, wherein sampling the subset of the plurality of text files comprises sampling the plurality of text files until one of:
   a predetermined number of rows has been read,
   a predetermined number of files has been read,
   a predetermined percentage of rows have been read, or
   a predetermined amount of time has expired.

10. The method of claim 7, wherein the subset of the plurality of text files comprises a random sample of the plurality of text files or a pattern that ensures a diverse set of files.

11. The method of claim 1, wherein:
    the graph statistics comprise, for each entity type of the plurality of entities, a number of distinct strings for a given string property, and
    estimating graph statistics comprises using a linear model and regressing to estimate a derivative of the number of distinct strings against a number of sampled strings.

12. The method of claim 1, wherein:
    the graph statistics comprise, for each entity type of the plurality of entities, a number of distinct strings for a given string property, and
    estimating graph statistics comprises using a trained machine learning model to classify the number of distinct strings as increasing linearly, increasing rapidly then more slowly, or increasing then plateauing.

13. The method of claim 1, wherein:
    the source is a database, and
    estimating graph statistics comprises executing one or more queries against the database to request the graph statistics.

14. The method of claim 1, wherein:
    predicting the estimated final graph size comprises using a first machine learning model to predict the estimated final graph size based on the graph statistics, and
    predicting the estimated peak memory usage comprises using a second machine learning model to predict the estimated peak memory usage based on the graph statistics.

15. The method of claim 14, wherein the first machine learning model and the second machine learning model are trained using a training data set comprising:
    a plurality of graphs having properties of different sizes,
    a plurality of graphs without properties and different numbers of vertices and edges, and
    a plurality of graphs having various numbers of vertices, properties, and edges.

16. The method of claim 14, wherein the first machine learning model and the second machine learning model are trained or retrained using historical graph loading data.

17. The method of claim 1, further comprising causing to be displayed to a user a cost estimate for loading the graph based on the memory consumption estimate.

18. One or more non-transitory storage media storing one or more sequences of instructions which, when executed by one or more computing devices, cause:
    for a graph to be loaded into memory of one or more machines of a distributed graph processing system, generating a memory consumption estimate by:
    sampling graph data of the graph from a source;
    estimating graph statistics for the graph based on the sampled graph data;
    predicting, based on the graph statistics, an estimated final graph size indicating an amount of memory used to keep a plurality of graph structures in memory, wherein:
       the graph comprises a plurality of entities and one or more edges between entities,
       the plurality of graph structures represent the graph, and
       the plurality of graph structures comprise at least one vertex data structure representing the plurality of entities of the graph and at least one edge data structure representing the one or more edges between entities; and
    predicting, based on the graph statistics, an estimated peak memory usage indicating an upper bound of memory usage across the one or more machines during loading of the graph,
    wherein the memory consumption estimate comprises the estimated final graph size and the estimated peak memory usage.

19. The one or more non-transitory storage media of claim 18, wherein:
    predicting the estimated final graph size comprises using a first machine learning model to predict the estimated final graph size based on the graph statistics, and
    predicting the estimated peak memory usage comprises using a second machine learning model to predict the estimated peak memory usage based on the graph statistics.

20. The one or more non-transitory storage media of claim 19, wherein the first machine learning model and the second machine learning model are trained or retrained using historical graph loading data.

* * * * *